Patented July 24, 1951

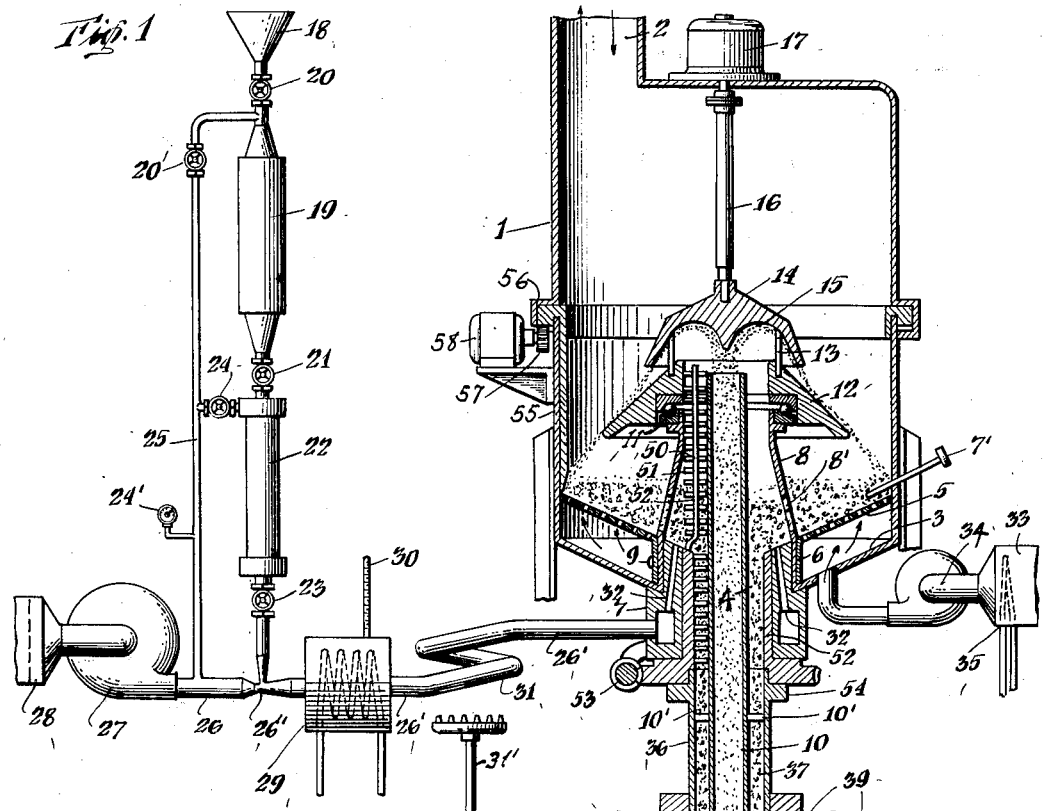
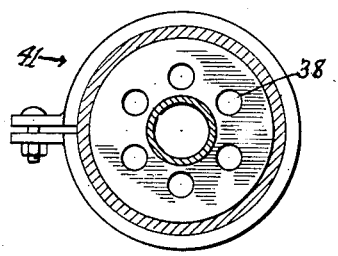

2,561,393

UNITED STATES PATENT OFFICE 2,561,393

PROCESS AND APPARATUS FOR VAPORIZING SOLUTIONS AND RECOVERING SOLIDS THEREFROM

Donald E. Marshall, Summit, N. J.

Application October 26, 1945, Serial No. 624,681

15 Claims. (Cl. 117—100)

This invention relates to a process and apparatus for vaporizing solutions or liquid mixtures which contain solids, separating the vapors from the solid particles, and then forming the solid particles into pellets by softening and impinging them upon a moving surface.

In carrying out the invention, such mixtures or solutions as detergents, milk, soups, fruit juices, and chemical solutions can be treated so as to obtain vapor and solid pellets at temperatures and in saturated atmospheres in such a manner that the materials are not injured and the delicate properties or qualities thereof are preserved.

Some of the most important features of this invention are:

A. All of the heat that is needed in carrying out the process is added to the material in a nearly saturated gas stream.

Heating a diffused solids-bearing solution to complete vaporization in a suitable gas vehicle can be effectively accomplished in this system with wide choice of temperature and pressure conditions ranging from gentle temperature gradients in heat exchanges and at a temperature below saturated low-pressure steam, such as 150° F. up to intensive temperatures gradients in heat exchanges and the highest temperatures that the material will withstand, to gain high efficiencies and capacities. In either extreme the solid particles being in a nearly saturated gas stream, are protected from local over-heating, over-drying or oxidation, in case of air vehicle, by the liquid films which exist during most of the heating period.

The introduction of heat into a liquid that has been diffused into an entraining high velocity gas stream produces many advantages over conventional liquid tube heat exchangers.

B. Vapors and solid particles are separated in a new type of evaporating chamber, wherein complete aeration and high velocity of the cooled circulating fluidized-solids produce several advantageous results, such as: the temperatures of the solids can be depressed considerably below that of the incoming saturated vapor stream without appreciably wasting heat needed for vaporization, thus making it possible to gain quality results usually associated with vacuum drying in which the solids are maintained at low temperature; the almost instant cooling of solids particle which occurs upon release from vapors avoids deterioration of the flavors and no necessary local over-heating or over-drying of surfaces occurs; high temperatures for incoming vapor stream can be used that are considerably above the melting point of the solids in the original material thus gaining high heat efficiency and high capacity from the equipment; fluidized solids having sticky surfaces are recycled in the form of a curtain or umbrella over the vapor stream and serve as a dust barrier; the conditions of temperature of circulating solids, temperature of saturated input gas stream and control of exposure of these two, can be maintained either in delicate balance so as to precipitate minute films of condensed vapors, or the circulating solids can be chilled far below the condensing temperature so as to precipitate thick films of condensate which bears the input solids; and the equivalent of liquid elutriation effect occurs in the circulating bed of fluidized solid particles serving to grade out chosen sized particles for removal as a graded, finished or semi-finished product.

C. Means are provided for continuous removal of finished pellets from an evaporating zone and for continuous addition of new nuclei, thereby maintaining only a small bed of solids in the process, thus the rapidity of separation from the heat zone is under control. A small mechanically cleaned and erosion-cleaned evaporation chamber accommodates solids of sticky character.

The various gas streams serve to induce complete fluidization and rapid recirculation of solids in process of treatment.

D. Means are provided for governing pellet formation to obtain sizes and structures having the desired characteristics to maintain the circulating particles at such temperatures as to soften and make them moldable; to expose recirculating solids to the saturated hot vapor stream so as to accumulate new liquid and solid matter; to impinge recirculating solid particles on a moving, deflecting surface; to tumble pellets on a revolving spreader; and to impinge pellets on the surface of an aerated bed of solid particles.

E. Also, chemical reactions can be carried on in the apparatus using an inert, indestructible bed of solid particles such as activated clays to provide a surface for the reaction. The inert material can be removed for heating or revivification and returned to the system. The structure and operation of the volatilizing chamber enables it to utilize the principle of fluid-solids surface for reaction where the conditions are not favorable to free-flowing beds of aerated solids through duct systems due to fouling of duct surfaces by the sticky solid-particles which carry some of the products of the reaction. The invention is also useful where continuous removal of the inert material is desired according to its size or density. In such a case the elutriating effect of the system is utilized to make this separation of the heavily ladened particles, bearing products of the reaction so that this material can be removed as a coked solid.

The portion of the apparatus described herein and shown in the drawing consisting of a vessel containing an aerated mass of solid particles that are kept in circulation so as to develop a graduation of sizes of particles from small sizes at the top of the mass to large and dense particles at the bottom thereof, is referred to as a fluidized-solids elutriator.

The invention may be understood from the following description in connection with the accompanying drawing in which Fig. 1 is a side view partly in section showing an illustrative embodiment of apparatus for carrying out the invention; and Fig. 2 is a section along the line 2—2 of Fig. 1.

In the drawing, reference character 1 indicates an upwardly extending flash chamber that has an outlet 2 at its upper end that may lead to a suitable dust collecting system and vapor recovery system, not shown. The chamber 1 has a conical bottom 3 that is provided with an opening 4 for downward removal of solid particles that are being treated.

A perforated cone 5 is spaced from the bottom 3 by means of its flange 6 and a nozzle ring casting 7. A sparger or draft tube 8 is supported by the nozzle ring casting 7 and fastened to it by rivets 9. Openings 8' in the lower portion of this sparger tube 8 which are in communication with the chamber 1 allow circulating material to enter the injector stream from the upper surface of the cone 5. A feed tube 10 has its upper portion located concentrically in the sparger tube 8 and ends at or near the upper end of this sparger tube. This tube is supported in a larger tube by stay rods 10'.

A ball bearing ring 11 is mounted on the outside upper portion of the sparger tube 8. The tube 8 serves as the main support for the ring 11. A rotatable pellet forming and spreader disc 12 is located above the ring 11. Rods 13 attached to disc 12 support a rotating reflector 14 which has a pelton cup surface 15 on the lower side thereof. This rotating assembly is driven by a flexible shaft 16 that is connected to a motor 17 that is mounted outside on top of the chamber 1 and is provided with an airtight packing gland for the shaft 16.

Filling means 18 in the form of a funnel is provided for introduction of the liquid mixture to be treated into the pressure drum 19. This drum is provided with inlet and outlet valves 20 and 21, as well as a gas pressure line valved inlet 20'. Below this pressure feed drum 19 there is a flow-gauge-glass 22 for watching the rate of input. This gauge 22 delivers through the bottom valve 23. A valved connection 24 and a pressure gauge 24' are provided in the gas pressure line 25.

Venturi restriction 26'' in feed line 26 serves to atomize input liquid into the air stream that is generated by the blower 27. This blower is equipped with a filter and heater unit 28 on its intake. The input gas may be air, or from an inert gas supply, or products of combustion of reducing or non-oxidizing nature, or low pressure saturated steam.

Feed line 26 from blower 27 leads to the main tubular heater 29 which is provided with a temperature indicator 30. A feed line 26' from the heater 29 leads to a vaporizing coil 31, that may be superheated in any convenient way. Time is permitted for all entrained liquid to be converted to superheated vapor in coil 31. Feed line 26' also extends from vaporizer 31, that is heated by the burner 31', to the nozzle plenum ring 7 by which hot vapor is delivered to the nozzles 32 that are spaced annularly around the opening 4. These nozzles 32 have ends opening into the sparger tube 8 for generating sparger or injector action as well as being the input to the vaporizing chamber for the material being treated, thus creating an under surface or layer of a fluidized solids bed inlet. The pressure line 25 balances the pressure that is needed to assist the Venturi atomizer 26'' in feed line 26 in feeding liquid into the entraining gas stream.

Fluidizing air or gas supply duct 33 is provided with a cooling coil 35 and the blower 34 to force fluidizing air into the space below the perforated hopper 5, which distributes the blast evenly and causes the bed of solids to become fluidized and seek a level and flow like water.

The discharge duct 36 removes solid products through the space 37 between this duct and the feed tube 10. An air and product lock 41 of pepper-shaker-top design having restricted annular openings 38 is provided at an intermediate portion of the duct 36. Flexible inlets 39 and 45 are provided for supplying elutriating air below and above openings 38 from an air or gas supply pipe 42 which has a gauge 43. These inlets are regulated by the valves 44 and 45. The duct 36 continues below the lock discharge 41 to a pressure reservoir 46 for cooled and semi-finished solid pellets. A valve 48 controls the pressure that is needed to aerate and force the semi-finished pellets up the feed tube 10 so as to be re-processed. The thermometer 49 enables the operator to control the cooling to a safe point for quality.

A mechanical sweep-cleaner 50 with prong scrapers 51 is mounted inside of the sparger tube 8 to dislodge any lumps and prevent any tendency for this tube to become encrusted on its inner surface. Also, fouling at the elutriator throat 4 is prevented by this cleaner. The cleaner 50 is provided with a sleeve 52 which is driven by a worm 53 connected to its lower end. A packing gland 54 is provided to seal the chamber. The worm may be operated by hand or power.

The inner surface of chamber 1 is maintained free of encrustations by a traveling scraper 55 attached to ring gear 56 which is driven by spur gear 57 and motor 58.

The operation is as follows:

A small charge of previous-processed solids is blown from the lower reservoir 46 through feed tube 10 onto the cone 15 while the lock 41 is closed and the valve 48 is opened sufficiently to provide enough pressure from the air supply line 42 to blow solids out of this reservoir. The blower 27 is started and sufficient heat is supplied to the entering air by the heater 28 to warm up the system. The deflecting discs 12 and 14 are started slowly and the fluidizing blower 34 and cooler 35 are operated to introduce air which starts the bed of solids on cone 5 to gravitate into the sparger 8 and recirculate.

When the pressure drum 19 has been filled with the liquid solution or mixture that is to be treated, the valve 21 is opened to supply the solution or mixture in drum 19 through the gauge 22 and slowly into the Venturi atomizer 26". More liquid can be added during the run by closing the valve 21 and refilling the drum 19 while the supply in the gauge 22 is being processed. As the liquid is diffused gradually into entrainer 26′ by the hot air stream from blower 27, the main heater 29 is regulated to supply sufficient heat to completely vaporize the liquid in the mixture and superheat it sufficiently to offset temperature drop in passing through evaporating chamber 1 and exposure to cooled solids that are in circulation. Heat efficiency is best at temperature levels that are the highest point the material will stand. The liquid input, the heat, and the entraining gas should be supplied so as to maintain a nearly saturated gas stream as it enters the evaporation chamber 1 regardless of the temperature at which the treatment is carried out.

Saturated vapors will then rise from the chamber 1 and be discharged through outlet 2 and the product duct 36 will discharge the solid particles. Violent agitation and recirculation of solid particles in the chamber 1 is caused to take place by adjustment of the speed of the blower 34 and by the spreading disc 12. Elutriating air supply and pressure is regulated by the valve 44 to clear the discharge space 37 of all but well formed larger particles. This valve 44 is set at the position to cause this.

The valve 23 and the heater 29 are adjusted so that the temperature and condition of the circulating bed of material is right for pellet formation in chamber 1 and yet not destructive to quality of the material being treated. The temperature of the bed of pellets of material on cone 5 is decreased by the cooling effect of the fluidizing air from blower 34 and by evaporation.

When the discharge duct 36 is filled with properly formed particles, the air lock 41 is opened and the pressures are regulated by means of valves 48, 44 and 45 so as to allow the large graded particles of the desired size to deposit in the reservoir 46 continually until it is filled. This elutriating air can be cooled if necessary to regulate the temperature of the finished product. After the system is operating in balance, the airlock 41 can be closed long enough to force the first-run material from the bottom of the reservoir 46 up the feed duct 10 into the evaporating chamber 1 for proper sizing.

The duct 26 and the heaters 28, 29 and 31′ are such that the condition and velocities of the material being treated sweep the surfaces clean. Also, the temperatures are such as not to burn the solids by local-overheating. When the atmosphere is kept nearly saturated overheating is avoided. Furthermore, variations in rate of feed of the input liquid can be made to wash the heating surfaces without upsetting the condition of the solids in the evaporating chamber.

The following are some of the advantages of this invention: The pellet formation is under several controls to gain the desired characteristics; the proper stickiness is controlled by operating at temperatures near the melting point of some ingredient in the incoming mixture which has been added and serves as a binder, such as silicates or phosphates in soap mixtures, or sugar in milk or soup mixtures; the amount and violence of rolling or forming or impinging can be regulated by the speed of the revolving spreader disc 12 and deflector 14; series processing through several stages of the device can be followed, thus allowing for aging between the stages and enabling a variety of solutions to be used stage by stage; since the input stream emerging from the nozzles 32 into the draft tube of the evaporating chamber is actually operating below the surface of the fluidized bed of solid particles a convenient control is provided over the pressure of the envelope of fluidized-solids which enclose these nozzles and the released vapor-bearing-solids stream, by increasing or decreasing the depth of bed above the nozzles. This is done by changing the position of the bed or the position of the nozzles themselves, up and down in any suitable manner; since it is possible to cool the recirculating bed well below the temperatures of vapors, by using more fluidizing air or colder air, the amount of condensate containing new solids which condenses on each particle can be regulated as the particles strike the hot saturated input vapors, so that stickiness can be developed for pellet formation in this manner without operating at the melting-point temperature of the solids; the explosive effect of retained moisture on particles struck by the hot vapor stream that enters the sparger tube can be controlled to produce peculiar structure effects on the recirculating particles and the density can be raised or lowered, and solubility modified by the resulting porosity of the formed particles thus greatly influencing wetting characteristics. For example, soap particles that are dense enough to sink in water quickly and are yet quite soluble and suitable for package-filling have been produced; and provisions for influencing the pelleting, and the structure of solid particles makes it possible to obtain almost any desired characteristic and appearance of the same.

Although this invention has been described in connection with evaporation processes, it is not limited to such processes.

With this invention various chemical or physical processes can be carried out where vapor and solids are to be separated under conditions that enable the control of such factors as temperature of vapors and solids, degree of exposure, structure and size of solid particles, size of evaporation chamber, and removal and addition of solids are desirable. Furthermore, chemical reactions such as the continuous saponification of fatty acids or fatty esters can be conducted on the surface of the recycling solid particles by introducing them and treating them for the time and at the temperature desired.

With this invention inert solid particles can be introduced into a mechanically cleaned chamber and recirculated and the heavier particles classified out and removed through an elutriating column. The process is not at any point dependent upon the development of a pseudo-hydrostatic head. Food and detergent materials which tend to become sticky at operating temperature desired, are very difficult to aerate and handle in a fluidized column either up or down because pseudo-hydrostatic head cannot be satisfactorily developed where adhesion forces interfere. Channelling of the solids mass occurs and encrusting and adhesion to duct wall militate against free flow. In the columns used in this process to feed the chamber, to circulate the bed of solid particles and to empty the chamber all are of the airveyor type and are not operated as full fluidized solids columns.

What is claimed is:

1. A process of treating a liquid containing volatile material and solid matter of relatively low melting point in order to reduce the solid material to compact, uniformly sized pellets of different classifications which comprises: continuously diffusing the liquid in atomized form into an entraining gas and then passing the resulting mixture at a high velocity through a heating zone to melt said solid matter and vaporize volatile material, continuously jetting the mixture upwardly at high velocity in the form of a plurality of gaseous streams into and through a confined contact zone, deflecting said streams at the upper end of the contact zone in a generally outward and downward direction to knock down and separate any solidified particles from gaseous material, impinging the particles on a surface while coincidently tumbling and whirling them outwardly, whereby said particles tend to become shaped to a pellet form, continuously removing the separated gaseous material, passing the particles to a fluidizing zone, recycling at least a portion of the particles from the fluidizing zone to the contact zone where they are picked up by the said upwardly flowing high velocity streams, said particles being subject to coating by solidifiable matter in said streams, and continuing the process as above described to shape and coat the particles until they are of such mass that upon reentry into the contact zone they fall out thereof instead of being picked up by said streams.

2. A process in accordance with claim 1 in which a cooling elutriating gas is introduced to the lower end of the contact zone.

3. A process of treating a liquid mixture containing solid matter dissolved or suspended therein and to reduce the solids to compact, uniformly sized pellets of different classifications which comprises: continuously passing the mixture in atomized form through a heating zone in the presence of an entraining gas and at a high velocity to vaporize volatile material, continuously passing the mixture upwardly at high velocity in the form of circularly arranged streams, jetting the streams into a contact zone whereby said streams traverse the contact zone and solid particles are formed therein, deflecting said streams at the upper end of the contact zone in a generally outward and downward direction to knock down and separate solid particles from vaporous material, continuously removing the separated vaporous material, coincidently tumbling and whirling the solid particles to shape them to a pellet form, passing the solid particles to a fluidizing zone and maintaining them in a fluidized state by introducing a fluidizing gas to the fluidizing zone, continuously recycling the particles from the fluidizing zone to the contact zone wherein lighter particles are picked up by the said upwardly flowing high velocity streams and heavier particles fall out thereof and are removed.

4. A continuous process for treating a solution which contains volatile portions and non-volatile substances in a system within a single chamber which comprises heating the solution in the presence of an entraining gas to vaporize the volatile portions thereof, introducing the solution suspended in said gas into the chamber and expanding it upwardly by jet action into and through a confined contact zone, separating the non-volatile substances from entraining gas and vaporized material at the upper portion of said zone, removing the latter material, passing the non-volatile substances downwardly to a collecting zone concentric to said contact zone, fluidizing said substances in the collecting zone and then reintroducing them to the lower part of said contact zone, whereby at least a portion of said substances are carried upwardly therein by said gas-suspended solution.

5. A process of treating a liquid containing solid material of relatively low melting point dissolved or suspended therein comprising the steps of partially vaporizing said liquid in the presence of an entraining gas, passing said liquid and vapors and entraining gas upwardly through a bed of fluidized carrier particles into a confined central zone by means of a jet action, thereby carrying at least some of said particles upwardly and coating the same, separating the particles from vaporous material and entraining gases at the upper end of said central zone, removing vaporous and gaseous material and passing the particles to a fluidizing zone adjacent said confined central zone, passing cooled fluidizing gas upwardly through the particles in said fluidizing zone to cool and maintain them in a fluidized state, returning cooled fluidized carrier particles to said central zone wherein at least a portion is recirculated by means of said jet action, and discharging a portion consisting of the heavier particles.

6. Apparatus for producing pelleted solid particles from a fluid containing said solid dissolved or suspended therein comprising a single chamber; an upstanding tube in said chamber; means for jetting a stream of said fluid suspended in gaseous material into the lower end of said tube for passage therethrough; rotatable deflecting means adjacent the upper end of said tube for separating solid particles from volatile material after passage of the same through said tube; rotatable means adjacent said deflecting means and supported on said tube for receiving, pelleting and whirling the separated solid particles outwardly in the form of a layer; a collecting zone adjacent said tube and below said layer of whirling particles for receiving said particles; means for fluidizing the particles in said collecting zone; means for returning fluidized particles from the collecting zone to the lower end of said tube for contact with said stream; means for removing volatile material from the chamber; and means for withdrawing solid particles from the chamber.

7. Apparatus for producing pelleted solid particles from a fluid containing solid matter comprising a single chamber; an upstanding tube in said chamber; means for jetting a stream of fluid suspended in gaseous material into the lower end of said tube for passage therethrough; deflecting means adjacent the upper end of said tube for separating solid particles from the gaseous material after passage of the same through said tube; rotatable means adjacent said deflecting means for receiving, pelleting and whirling the separated solid particles outwardly in the form of a layer concentric with said tube; a fluidizing zone in said chamber adjacent said tube and below said layer of whirling particles for receiving said particles; means for fluidizing the particles in said fluidizing zone; means for returning fluidized particles from the fluidizing zone to the lower end of said tube for contact with said stream; means for withdrawing gaseous material from the chamber; means for withdrawing solid particles from the chamber; means for aerating the particles withdrawn from the chamber; and means for returning a portion thereof to said tube.

8. Apparatus for producing pelleted solid particles comprising a single chamber; an upstanding tube in said chamber; means for jetting a stream of volatile material and solids suspended in a gas into the lower end of said tube for passage therethrough; deflecting means adjacent the upper end of said tube for separating solids from volatile material after passage of the same through said tube; rotatable means adjacent said reflecting means for receiving, pelleting and whirling the separated solids outwardly in the form of a layer of particles; a fluidizing zone surrounding said tube and below said layer of whirling particles for receiving said particles; means for fluidizing the particles in said fluidizing zone; means for returning fluidized particles from the fluidizing zone to the lower end of said tube for contact with said stream; means for removing volatile material from the chamber; means for removing solid particles from the chamber; means for aerating the particles withdrawn from the chamber; and a feed tube for returning a portion of the aerated particles to the upper end of said tube.

9. Apparatus for producing compact solid particles from a solution containing solid matter comprising a single chamber; an upstanding tube in said chamber; means for jetting a stream of said solution suspended in a gas into the lower end of said tube for passage therethrough; mechanical sweep means extending into said tube for wiping the inner surfaces of said tube; separating means adjacent the upper end of said tube for separating solid particles from the stream after passage of the same through said tube; means in the chamber secured to said separating means for receiving and compacting the separated solid particles; a collecting zone adjacent said tube for receiving said compacted particles; means for fluidizing the particles in said collecting zone; means for returning fluidized particles from the collecting zone to the lower end of said tube for contact with said stream; means for removing gaseous material from the chamber; and means for withdrawing the heavier solid particles from the chamber.

10. A process of treating a liquid containing solid material of relatively low melting point dissolved or suspended therein which comprises the steps of vaporizing a portion of the liquid in the presence of gaseous material to form an overall gaseous stream, introducing the overall stream to the bottom of a chamber and passing it upwardly therein through a confined contact zone by a jet action; introducing previously formed particles of said solid material to said contact zone in the path of said overall stream, whereby the particles are carried along by said stream and coated by said liquid containing said solid material; passing the stream including the coated particles to a deflecting zone where non-gaseous material is separated from gaseous material and passed downwardly into a fluidizing zone adjacent and surrounding said contact zone, fluidizing the material in the fluidizing zone by means of a cooled fluidizing gas and passing the material to the inlet of the contact zone, removing from the chamber a portion of the fluidized material at said contact zone inlet and recycling a portion thereof through said contact zone by said jet action, and removing the gaseous material from the chamber.

11. A process of treating a fluid containing solidifiable matter dissolved or suspended therein to reduce such matter to compact discrete particles comprising the steps of entraining said fluid in an entraining gas, heating the fluid and gas above the solidifying point of said solidifiable matter and then introducing the same to the bottom of a closed chamber, passing the fluid and the entraining gas upwardly into a centrally confined zone in said chamber and generating a jet action therein, separating solidified particles resulting from said jet action by introducing the effluents from said confined zone to a deflecting zone above said confined zone, passing separated particles outwardly and downwardly by gravity from the deflecting zone to a fluidizing zone surrounding said confined zone, fluidizing and cooling the particles in said fluidizing zone by introducing cooled fluidizing gas thereto, returning fluidized solid particles to the bottom of the chamber where a portion is entrained and recycled by virtue of said jet action of said upwardly flowing entrained fluid, removing another portion of the returned particles from said chamber, and discharging from the chamber the gases separated from the particles in the deflecting zone.

12. The process of claim 11 wherein the particles solidified in said central confined zone and the recycled particles are coated by the introduced fluid.

13. A process of treating liquid feed containing non-volatile material including solid matter of relatively low solidifying point in order to reduce the non-volatile material to compact particles which comprises: continuously passing the feed in atomized form through a heating zone at a high velocity to volatilize a part of said feed and to melt said low solidifying solid matter, jetting the heated atomized feed upwardly at high velocity in the form of a plurality of streams into and through a contact zone, whereby said atomized streams traverse the contact zone in intermingled form, separating said intermingled streams at the upper end of the contact zone into volatile material and non-volatile material including any solidified particles, continuously removing the separated volatile material from the upper end of said contact zone, passing the non-volatile material and solidified particles to a fluidizing zone surrounding said contact zone, fluidizing the particles in the fluidizing zone by introducing fluidizing gas to the lower portion of the same, continuously passing fluidized particles from the latter zone to the inlet of said contact zone where they are picked up by virtue of the jet action of said upwardly flowing high velocity intermingled streams, said solidified particles being coated by the non-volatile and solidifiable material in said intermingled streams, continuing the process as above described to coat solidified particles until they are of such size that upon reentry into the contact zone from the fluidizing zone they fall out thereof instead of being picked up by said intermingled streams.

14. A process of treating a liquid mixture containing solid matter dissolved or suspended therein in order to recover the solid matter in finely divided form which comprises: continuously heating the mixture under pressure in the presence of an entraining gas, jetting said entrained mixture upwardly at a high velocity into a contact zone in the form of a plurality of streams, said streams comprising solid particles and gaseous material, deflecting said streams at the upper end of the contact zone in a generally outward and downward direction to knock down and separate solid particles from gaseous material, tumbling the solid particles outwardly of the upper end of said zone in order to shape the particles to pellet form, passing the particles to an aerating zone concentric with the contact zone and below the said upper end thereof, continuously introducing aerating gas to the lower portion of the aerating zone to aerate the particles therein, passing a portion of the aerated particles to the lower end of the contact zone to be picked up by the said upwardly flowing high velocity streams, withdrawing a portion as produce, and utilizing the aerating gas leaving the aerating zone to help remove said separated gaseous material.

15. A process of treating a liquid mixture containing solid matter dissolved or suspended therein in order to recover the solid matter in the form of particles which comprises: continuously atomizing the mixture into an entraining gas, passing the stream of entrained atomized mixture to a heating zone, expanding the heated stream beyond the heating zone, jetting the expanded stream upwardly at high velocity in the form of a plurality of streams to and through a contact zone, whereby said jetted streams traverse the contact zones in intermingled form and at a high velocity, deflecting said intermingled streams at the upper end of the contact zone in a generally outward and downward direction to separate gaseous material from non-volatile material including solid particles formed from said mixture, passing the non-volatile material and solid particles to a zone concentric with the contact zone to promote the coating of the solid particles by the non-volatile material, aerating the particles in said concentric zone by introducing aerating gas thereto, recycling aerated particles from the concentric zone to the contact zone where they are picked up by the said upwardly flowing high velocity intermingled streams, and continuing the process as above described to coat the solid particles until they are of such size that upon reentry into the contact zone they fall out thereof instead of being picked up by said intermingled streams.

DONALD E. MARSHALL.

REFERENCES CITED

The following references are of record in the file of this patent:

UNITED STATES PATENTS

| Number | Name | Date |
|---|---|---|
| 410,067 | Bower | Aug. 27, 1889 |
| 1,078,848 | Gray et al. | Nov. 18, 1913 |
| 1,157,935 | Gray | Oct. 26, 1915 |
| 1,847,009 | Kollbohm | Feb. 23, 1932 |
| 1,859,992 | Seil | May 24, 1932 |
| 1,874,150 | Anger | Aug. 30, 1932 |
| 1,875,754 | Nelson | Sept. 6, 1932 |
| 1,959,301 | Northcutt et al. | May 15, 1934 |
| 2,054,441 | Peebles | Sept. 15, 1936 |
| 2,289,191 | Hall | July 7, 1942 |
| 2,312,474 | Peebles | Mar. 2, 1943 |
| 2,337,684 | Scheineman | Dec. 28, 1943 |
| 2,339,932 | Kuhl | Jan. 25, 1944 |
| 2,347,682 | Gunness | May 2, 1944 |
| 2,399,717 | Arveson | May 7, 1946 |
| 2,431,455 | Blanding | Nov. 25, 1947 |
| 2,447,005 | Gamson | Aug. 17, 1948 |
| 2,447,006 | Gamson | Aug. 17, 1948 |
| 2,475,984 | Owen | July 12, 1949 |